United States Patent Office 3,636,112
Patented Jan. 18, 1972

3,636,112
α-HALO-α-FORMYL-CARBONYL-PHENYL-HYDRAZONES
Wilfried Draber and Karl Heinz Büchel, Wuppertal-Elberfeld, Ingeborg Hammann, Cologne, and Günter Unterstenhöfer, Opladen, Germany, assignors to Farbenfabriken Bayer Aktiengesellschaft, Leverkusen, Germany
No Drawing. Filed July 2, 1969, Ser. No. 838,631
Claims priority, application Germany, July 4, 1968,
P 17 68 825.4
Int. Cl. C07c *119/00*
U.S. Cl. 260—566 B                                9 Claims

ABSTRACT OF THE DISCLOSURE

α-halo - α - formyl-carbonyl-phenyl-hydrazones, i.e. α-(chloro and bromo)-α-(formyl, dioxa-pentamethylene and oxa-thia-pentamethylene)-carbonyl - (mono to tri alkyl, chloro, trifluoromethyl, trifluoromethyl mercapto and/or alkyl sulfonyl-substituted phenyl)-hydrazones, which possess arthropolicidal, especially acaricidal and insecticidal, properties, and which may be produced by conventional methods.

---

The present invention relates to and has for its objects the provision for particular new α-halo-α-formyl-carbonyl-phenyl-hydrazones, i.e. α-(chloro and bromo)-α-(formyl, dioxa - pentamethylene and oxa-thia-pentamethylene)-carbonyl - (mono to tri alkyl, chloro, trifluoromethyl, trifluoromethyl mercapto and/or alkyl sulfonyl-substituted phenyl) - hydrazones, which possess arthropodicidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

It is already known that certain phenylhydrazones, for example α,α-dicyano-carbonyl - 2,5 - dichloro-phenyl-hydrazone (A), can be used for the control of insects and mites (see U.S. Pat. 3,157,569).

It has now been found, in accordance with the present invention, that the particular new phenylhydrazones of the formula

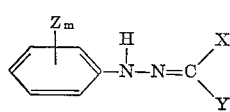
(I)

in which:

X is chloro or bromo,
Y is formyl, 2,5-dioxa-pentamethylene or 2-oxa-5-thia-pentamethylene,
Z, each individually, is alkyl of 1–4 carbon atoms, chloro, trifluoromethyl, trifluoromethylmercapto or alkyl-sulfonyl having 1–4 carbon atoms in the alkyl moiety, and
$m$ is a whole number from 1 to 3, exhibit strong arthropodicidal, especially insecticidal and acaricidal, properties.

It has been furthermore found, in accordance with the present invention, that the compounds of Formula I above may be produced by the process which comprises:
[a] Reacting a diazotized amine of the formula

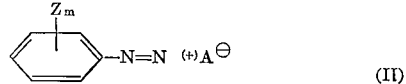
(II)

in which:

Z and $m$ are the same as defined above, and
$A^\ominus$ stands for an anion occurring during the diazotization, optionally in the presence of a solvent, with a halomalonic dialdehyde of the formula

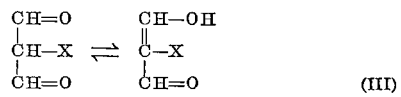
(III)

in which X is the same as defined above, or
[b] Reacting a phenylhydrazone of the formula

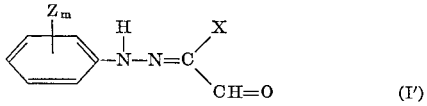
(I′)

in which Z, X and $m$ are the same as defined above, in the presence of a solvent, and optionally in the presence of an acidic catalyst, with an alcohol or a thiol of the formula

$$B—(CH_2)_n—D \quad (IV)$$

in which:

B is OH,
D is OH or SH, and
$n$ is 2.

Advantageously, the particular new compounds of Formula I above are distinguished by outstanding insecticidal and acaricidal properties as well as, in most cases, extremely low toxicity to warm-blooded animals and concomitantly low phytotoxicity. The instant compounds especially possess a very strong acaricidal activity. Significantly, the compounds of the present invention are clearly superior to the above-mentioned comparable known compounds (A) of analogous constitution and the same type of activity. The new compounds of the present invention therefore represent a valuable contribution to the art.

If 3-chloro-aniline diazotized in the customary manner in hydrochloric acid at 0–10° C. is used as starting material, the reaction course of process variant [a] can be represented by the following reaction scheme:

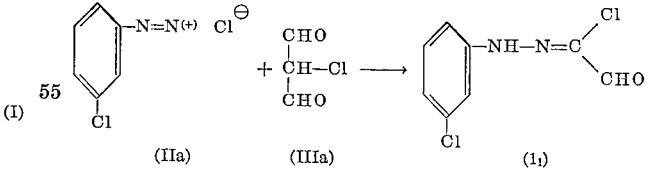

On the other hand, the reaction course of process variant [b] can, for example, be represented by the following reaction scheme:

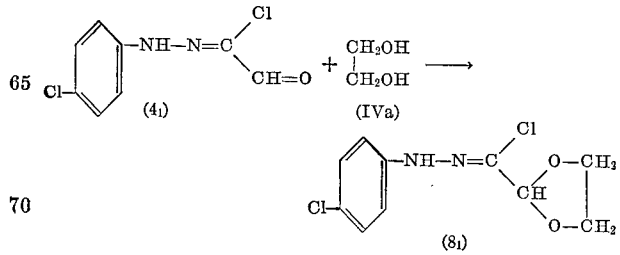

Advantageously, in accordance with the present invention, in the various formulae herein:

X represents
  chloro; or
  bromo;
Y represents
  formyl, i.e. —CH=O; or
  2,5-dioxa-pentamethylene; or
  2-oxa-5-thia-pentamethylene;
Z, each indixidual, represents straight and branched chain lower alkyl hydrocarbon of 1–4 carbon atoms such as methyl ethyl, n- and iso-propyl, n-, iso-, sec.- and tert.-butyl, and the like, especially $C_{1-3}$ or $C_{1-2}$ alkyl; chloro; trifluoromethyl, i.e. —$CF_3$; trifluoromethylmercapto, i.e. $CF_3$—S—; or alkyl-sulfonyl having 1–4 carbon atoms in the alkyl moiety, such as methyl to tert.-butyl inclusive, as defined above, and the like, -sulfonyl, i.e. $C_{1-4}$ alkyl—$SO_2$—, especially $C_{1-3}$ or $C_{1-2}$ alkyl—$SO_2$—; and
m represents
  a whole number from 1 to 3;

such that Zm on the corresponding phenyl moiety includes mono 2-, 3- and 4-; di (same or mixed) 2,3-, 2,4-, 2,5-, 2,6-, 3,4- and 3,5-; and tri (same or mixed) 2,3,4-, 2,3,5-, 2,3,6-, 2,4,5-, 2,4,6- and 3,4,5-; $C_{1-4}$ alkyl, chloro, trifluoromethyl, trifluoromethylmercapto and/or $C_{1-4}$ alkylsulfonyl substituted phenyl, especially 2-, 3- and 4-chloro, 3,4- and 3,5- dichloro, and 2,4,5- trichloro; 3,5-di trifluoromethyl; 4-trifluoromethylmercapto; 2 - chloro - 6 - $C_{1-4}$ alkyl; 2-chloro-5-trifluoromethyl and 4-chloro-2-trifluoromethyl; and 2-$C_{1-4}$ alkyl-sulfonyl-5-trifluoromethyl; -substituted phenyl.

Preferably, X is chloro or bromo, especially chloro; Y is formyl, or 2,5-dioxa-pentamethylene, or 2-oxa-5-thia-pentamethylene; each Z, individually, is $C_{1-2}$ alkyl, or chloro, or trifluoromethyl, or trifluoromethylmercapto, or $C_{1-2}$ alkyl-sulfonyl, or mixtures of 2–3 thereof; and m is 1–3.

In particular, X is chloro; Y is formyl, or 2,5-dioxapentamethylene; each Z, individually, is chloro or trifluoromethyl; and m is 1–3.

The starting materials according to Formulae II and III above for process variant [a] are known and accessible in simple manner.

The starting materials according to Formula I' above for process variant [b] are prepared pursuant to process variant [a] as the artisan will appreciate. The other starting materials according to Formula IV above for this process variant are likewise known.

Process variant [a] is generally carried out in water, preferably in a pH range of 4–7. For buffering, bases such as sodium acetate, sodium carbonate, sodium hydroxide, and the like, are added. The reaction temperatures may range from substantially between about 0 to +20° C. The required starting materials are expediently used in equimolar amounts, but the aldehyde component may optionally be present in excess. The reaction is, in general, complete after 1–6 hours at room temperature. The phenylhydrazones of Formula I above are obtained in crystalline form and can be isolated by suction filtration.

In process variant [b], water-immiscible solvents are generally used, such as aromatic hydrocarbons, for example benzene, toluene, xylene; chlorinated hydrocarbons, for example chloro-benzene, chloroform; and ethers, such as diethyl ether; and the like.

As acidic catalyst for process variant [b], organic and inorganic acids are suitable, such as p-toluene-sulfonic acid and sulfuric acid; or Lewis acids, such as boron trifluoride, or the like.

The process variant [b] reaction temperatures are, in general, from substantially between about 0 to 150° C., preferably between about 20 to 120° C.

The water formed during the reaction according to variant [b] is expediently distilled off azeotropically, together with a portion of the solvent. Before the reaction product is isolated by concentration from the solution, the acidic catalyst is expediently removed, for example by shaking with an aqueous solution of sodium bicarbonate. The further working up takes place in customary manner.

Advantageously, the active compounds according to the present invention exhibit strong insecticidal and, in particular, acaricidal, effects, with comparatively low mammalian toxicity and concomitantly low phytotoxicity. The instant active compounds can therefore be used with markedly good results for the control of noxious sucking and biting insects, Diptera and mites (Acarina).

To the sucking insects contemplated herein there belong, in the main, aphids, such as the green peach aphid (Myzus persicae), and the bean aphid (Doralis fabae); scales, such as Aspidiotus hederae, Lecanium hesperidum, and Pseudococcus maritimus; Thysanoptera, such as Hercinothrips femoralis; and bugs, such as the beet bug (Piesma quadrata) and the bed bug (Cimexlectularius); and the like.

With the biting insects contemplated herein, there are classed, in the main butterfly caterpillars, such as Plutella maculipennis, and Lymantria dispar; beetles, such as granary weevils (Sitophilus granarius), the Colorado beetle Leptinotarsa decemlineata), but also species living in the soil, such as the wireworms (Agriotes sp.) and larvae of the cockchafer (Melolontha melolontha); cockroaches, such as the German cockroach (Blattella germanica); Orthoptera, such as the house cricket (Gryllus domesticus); termites, such Reticulitermes: Hymenoptera, such as ants; and the like.

The Diptera contemplated herein comprise, in particular, the flies, such as the vinegar fly (Drosophila melanogaster), the Mediterranean fruit fly (Ceratitis capitata), the house fly (Musca domestica), and mosquitoes, such as the yellow fever mosquito (Aedes aegypti); and the like.

In the case of the mites contemplated herein, particularly important are the spider mites (Tetranychidae) such as the two-spotted spider mite (Tetranychus urticae), and the European red mite (Paratetranychus pilosus); gall mites, such as the currant gall mite (Eriophyes ribis) and tarsonemids, such as Tarsonemus pallidus, and ticks; and The pesticidal effects set in rapidly and are long-lasting.

If the instant phenylhydrazones are used in the form of their salts, their effectiveness, in general, changes only extremely slightly.

Besides insecticidal and acaricidal properties, the active compounds according to the present invention also advantageously exhibit fungicidal properties against phytopathogenic fungi, in particular those which infest the seed and the leaves of useful plants.

The active compounds according to the instant invention can be utilized, if desired, in the form of the usual formulations or compositions with conventional inert (i.e. plant compatible or herbicidally inert) pesticidal diluents or extenders, i.e. diluents or extenders of the type usable in conventional pesticidal formulations or compositions, e.g. conventional pesticidal dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chloro-benzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.) amides (e.g. dimethyl formamide, etc.), sulfoxides (e.g. dimethyl sulfoxide, etc.), ketone (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct applications or field application generally contemplate those in which the active compound is present in an amount substantially between about 0.001–5%, preferably 0.01–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 80 or 95% by weight of active compound or even the 100% active substance alone, e.g. about 20–100% by weight of the active compound.

In particular, the present invention contemplates methods of selectively killing, combating or controlling pests, e.g. arthropods, i.e. insects and acarids, and more particularly, methods of combating at least one of insects and acarids which comprises applying to at least one of correspondingly (a) such insects, (b) such acarids, and (c) the corresponding habitat, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Tetranychus test

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus urticae*) in all stages of development.

After the specified period of time, the effectiveness of the given preparation of active compound is determined by counting the dead mites. The degree of destruction thus obtained is expressed as a percentage: 100% means that all the spider mites are killed, whereas 0% means that none of the spider mites are killed.

The particular active compounds tested, their concentrations, the evaluation time and the results obtained can be seen from the following Table 1:

TABLE 1.—PLANT-DAMAGING MITES
*Tetranychus urticae*

| Active Compound Number (see Table 3) | Concentration of active compound in percent | Degree of destruction in percent after 8 days |
| --- | --- | --- |
| (A) 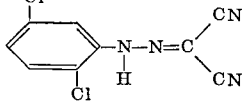 (known) | 0.2<br>0.02 | 70<br>0 |
| (3₁) | 0.2<br>0.02 | 100<br>90 |
| (1₂) | 0.2<br>0.02 | 100<br>100 |
| (4₂) | 0.2<br>0.02<br>0.002 | 100<br>98<br>70 |
| (5₁) | 0.2<br>0.02 | 90<br>60 |
| (6₁) | 0.2<br>0.02 | 100<br>100 |
| (7₁) | 0.2<br>0.02 | 100<br>70 |
| (8₂) | 0.2<br>0.02 | 100<br>100 |
| (9₁) | 0.2<br>0.02 | 100<br>80 |
| (10₁) | 0.2<br>0.02 | 98<br>70 |
| (11₁) | 0.2<br>0.02 | 98<br>70 |

TABLE 1—Continued

| Active Compound Number (see Table 3) | Concentration of active compound in percent | Degree of destruction in percent after 8 days |
|---|---|---|
| (12₁) | 0.2 | 100 |
|  | 0.02 | 80 |
|  | 0.002 | 70 |
| (23₁) | 0.2 | 98 |
|  | 0.02 | 98 |
| (24₁) | 0.2 | 100 |
|  | 0.02 | 100 |
|  | 0.002 | 90 |
| (25₁) | 0.2 | 100 |
|  | 0.02 | 90 |
| (26₁) | 0.2 | 100 |
|  | 0.02 | 98 |
| (27₁) | 0.2 | 100 |
|  | 0.02 | 100 |
| (29₁) | 0.2 | 100 |
|  | 0.02 | 50 |
| (32₁) | 0.2 | 100 |
|  | 0.02 | 90 |
| (36₂) | 0.2 | 100 |
|  | 0.02 | 100 |
| (37₁) | 0.2 | 100 |
|  | 0.02 | 60 |
| (38₁) | 0.2 | 98 |
|  | 0.02 | 98 |
| (39₁) | 0.2 | 100 |
|  | 0.02 | 98 |
| (40₁) | 0.2 | 100 |
|  | 0.02 | 100 |
|  | 0.002 | 98 |
| (43₁) | 0.2 | 100 |
|  | 0.02 | 90 |
| (22₁) | 0.2 | 100 |
|  | 0.02 | 60 |

EXAMPLE 2

Phaedon larvae test

Solvent: 3 parts by weight dimethyl formamide
Emulsifier: 1 part by weight alkylaryl polyglycol ether.

To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dripping wet and then infested with mustard beetle larvae (*Phaedon cochleariae*).

After the specified period of time, the degree of destruction is determined as a percentage: 100% means that all the beetle larvae are killed, whereas 0% means that none of the beetle larvae are killed.

The particular active compounds tested, their concentrations, the evaluation time, and the results obtained can be seen from the following Table 2:

TABLE 2.—PLANT-DAMAGING INSECTS
*Phaedon larvae*

| Active Compound Number (see Table 3) | Concentration of active compound in percent | Degree of destruction in percent after 3 days |
|---|---|---|
| (A) 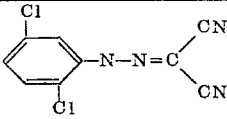 (known) | 0.2 | 100 |
|  | 0.02 | 0 |
| (1₃) | 0.2 | 100 |
|  | 0.02 | 55 |
| (5₂) | 0.2 | 100 |
|  | 0.02 | 45 |
| (8₃) | 0.2 | 100 |
|  | 0.02 | 75 |

The following further examples are set forth to illustrate, without limitation, the process for producing the instant active compounds according to the present invention.

Example 3 [reaction variant (a)]

(1₄)

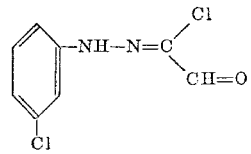

63.8 g. of 3-chloro-aniline are diazotized in 500 ml. of ice water and 100 ml. of concentrated hydrochloric acid. The solution of the diazonium salt is filtered and added dropwise to a solution of 53.3 g. of chloromalonic dialdehyde and 250 g. of sodium acetate in 3 liters of ice water. Stirring is effected for 3 hours, followed by suction filtration and washing with water. 103.5 g. of the yellowish-brown hydrazone, i.e.

(α-chloro-α-formyl)-carbonyl - 3 - chloro-phenyl-hydrazone (95.3% of the theory) of M.P. 160–162° C. are obtained. After recrystallization from acetone, the M.P. is 164–166° C. (yellow needles).

Example 4 [reaction variant (b)]

(10₂)

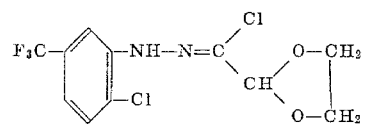

28.5 g. of α - chloro - α-formyl-carbonyl phenyl-hydrazone, prepared in analogy with Example 3, are dissolved in 500 ml. of benzene. 25 g. of ethyleneglycol and 0.1 g. of p-toluenesulfonic acid are added and the mixture is boiled at a water separator for 12 hours. Cooling is then allowed to take place, and the benzene solution is extracted with aqueous bicarbonate; whereupon drying with calcium chloride is effected, and then concentration. There remains behind a yellow residue, which is recrystallized from petroleum ether. 23.0 g. (70% of the theory) of yellow needles, i.e. α - chloro - α-(2',5'-dioxa-pentamethylene)-carbonyl-(2 - chloro - 5 - trifluoromethyl)-phenyl-hydrazone, of M.P. 96–99° C. are obtained.

EXAMPLE 5

In a manner analogous with that described in Examples 3 and 4, the following compounds of the Formula I are also prepared:

TABLE 3

| No. | X | Y | Z | M.P. (° C.) |
|---|---|---|---|---|
| (3₂) | Cl | CH=O | 2-Cl | 92–93 |
| (7₂) | Cl | CH=O | 3,5-(CF₃)₂ | 146–150 |
| (4₃) | Cl | CH=O | 4-Cl | 206–207 |
| (13₁) | Cl | CH=O | 2-Cl, 6-CH₃ | 59 |
| (5₃) | Cl | CH=O | 3,4-Cl₂ | 196–199 |
| (14₁) | Cl | CH=O | 2-Cl, 5-CF₃ | 109–111 |
| (15₁) | Cl | CH=O | 2-SO₂C₂H₂, 5-CF₃ | 137–139 |
| (16₁) | Cl | CH=O | 2-CF₃, 4-Cl | 63–65 |
| (6₂) | Cl | CH=O | 2,4,5-Cl₃ | 142–144 |
| (17₁) | Cl | CH=O | 4-SCF₃ | 169–172 |
| (8₁) | Cl | CH(OCH₂)₂ | 4-Cl | 112–117 |
| (11₂) | Cl | CH(OCH₂)₂ | 2-CF₃, 4-Cl | 110–111 |
| (12₂) | Cl | CH(OCH₂)₂ | 3,5-(CF₃)₂ | 129–132 |
| (9₂) | Cl | CH(OCH₂)₂ | 2,4,5-Cl₃ | 121–124 |
| (2₁) | Cl | CH(OCH₂)₂ | 3-Cl | 146–149 |
| (18₁) | Cl | CH=O | 3,5-Cl₂ | 199–200 |
| (19₁) | Cl | CH(OCH₂)₂ | 3,5-Cl₂ | 227 |
| (20₁) | Br | CH=O | 3,5-Cl₂ | 177–179 |
| (21₁) | Cl | CH=O | 4-SCF₃ | 169–172 |
| (22₂) | Cl | CH⟨S-CH₂ / O-CH₂⟩ | 3,5-(CF₃)₂ | 104–105 |
| (23₂) | Cl | CH=O | 3-CF₃ | 150–151 |
| (24₁) | Cl | CH=O | 2,4-Cl₂ | 112–114 |
| (25₁) | Cl | CH=O | 2,3-Cl₂ | 127–129 |
| (26₁) | Cl | CH=O | 2,5-Cl₂ | 121–123 |
| (27₂) | Br | CH=O | 4-Cl | 194–197 |
| (28₁) | Br | CH=O | 3-CF₃ | 149–151 |
| (29₁) | Br | CH=O | 1,4,5-Cl₃ | 146–148 |
| (30₁) | Br | CH=O | 3,4-Cl₂ | 198–200 |

TABLE 3.—Continued

| No. | X | Y | Z | M.P. (° C.) |
|---|---|---|---|---|
| (31₁) | Br | CH=O | 2-Cl, 5-CF₃ | 112–115 |
| (32₂) | Br | CH=O | 2-Cl | 91–95 |
| (33₁) | Br | CH=O | 2-CF₃, 4-Cl | 73–75 |
| (34₁) | Br | CH=O | 3,5-(CF₃)₂ | 147–150 |
| (35₁) | Br | CH=O | 2,4-Cl₂ | 111–116 |
| (36₂) | Cl | CH(OCH₂)₂ | 2,4-Cl₂ | 67–68 |
| (37₂) | Cl | CH⟨O—CH₂ / S—CH₂⟩ | 4-Cl | 119–124 |
| (38₂) | Cl | Same as above | 3,4-Cl₂ | 108–111 |
| (39₂) | Cl | ....do.... | 2-Cl, 5-CF₃ | 104–107 |
| (40₂) | Cl | ....do.... | 3-CF₃ | 73–77 |
| (41₁) | Br | CH(OCH₂)₂ | 4-Cl | 105–107 |
| (42₁) | Br | CH⟨O—CH₂ / S—CH₂⟩ | 4-Cl | 106–108 |
| (43₂) | Cl | Same as above | 3-Cl | 65–76 |

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, the terms "arthropod," arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodically effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. Phenyl-hydrazone of the formula

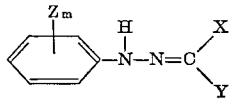

in which X is selected from the group consisting of chloro or bromo, Y is formyl, each Z, individually, is selected from the group consisting of alkyl of 1–4 carbon atoms, chloro, trifluoromethyl, trifluoromethylmercapto and alkyl-sulfonyl having 1–4 carbon atoms in the alkyl moiety, and m is a whole number from 1 to 3.

2. Compound according to claim 1 wherein X is selected from the group consisting of chloro and bromo, each Z, individually, is selected from the group consisting of $C_{1-2}$ alkyl, chloro, trifluoromethyl, trifluoromethylmercapto and $C_{1-2}$ alkyl-sulfonyl, and m is 1–3.

3. Compound according to claim 1 wherein X is chloro, each Z, individually, is selected from the group consisting of chloro and trifluoromethyl, and m is 1–3.

4. Compound according to claim 1 wherein X is selected from the group consisting of chloro and bromo, and $Z_m$ is selected from the group consisting of 2-, 3- and 4-chloro, 3,4-dichloro, 3,5-dichloro, 2,4,5-trichloro, 3,5-di-trifluoromethyl, 4-trifluoromethylmercapto, 2-chloro-6-$C_{1-4}$ alkyl 2-chloro-5-trifluoromethyl, 4-chloro-2-trifluoromethyl and 2-$C_{1-4}$ alkyl-sulfonyl-5-trifluoromethyl.

5. Compound according to claim 1 wherein X is chloro, and $Z_m$ is selected from the group consisting of 2-, 3- and 4- chloro, 3,4-dichloro, 3,5-dichloro, 2,4,5-trichloro, 3,5-di-trifluoromethyl, 4-chloro-2-trifluoromethyl and 2-chloro-5-trifluoromethyl.

6. Compound according to claim 1 wherein such compound is (α-chloro-α-formyl)-carbonyl-(3-chloro)-phenyl-hydrazone of the formula

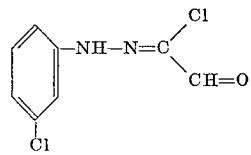

7. Compound according to claim 1 wherein such compound is (α-chloro-α-formyl)-carbonyl-(3,4-dichloro)-phenyl-hydrazone of the formula

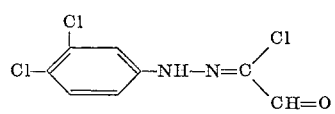

8. Compound according to claim 1 wherein such compound is (α-chloro-α-formyl)-carbonyl-(3,5-ditrifluoromethyl)-phenyl-hydrazone of the formula

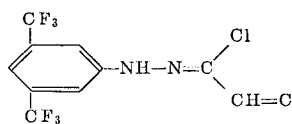

9. Compound according to claim 1 wherein such compound is (α-chloro-α-formyl)-carbonyl-(4-chloro)-phenyl hydrazone of the formula

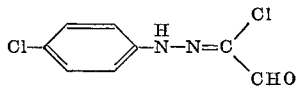

References Cited

Barber et al., J. Chem. Soc. (London) pp. 2828–2843 (1961).

BERNARD HELFIN, Primary Examiner

G. A. SCHWARTZ, Assistant Examiner

U.S. Cl. X.R.

260—327 m, 340.9; 424—276, 278, 327

PO-1050
(5/69)

UNITED STATES PATENT OFFICE
CERTIFICATE OF CORRECTION

Patent No. 3636112            Dated January 18, 1972

Inventor(s) Wilfried Draber, et al

It is certified that error appears in the above-identified patent and that said Letters Patent are hereby corrected as shown below:

<u>Col. 4, line 43</u>

After "and" (ad occurrence) insert --the like.--

<u>Col. 8, line 32</u>

After "carbonyl" insert --(2-chloro-5-trifluoromethyl)--

<u>Col. 8, Table 3</u>

4th from top figure, last column, "59" should be --52--

Signed and sealed this 20th day of June 1972.

(SEAL)
Attest:

EDWARD M. FLETCHER, JR.      ROBERT GOTTSCHALK
Attesting Officer               Commissioner of Patents